(12) United States Patent
Patel et al.

(10) Patent No.: US 11,547,928 B1
(45) Date of Patent: *Jan. 10, 2023

(54) SYSTEM AND METHOD FOR ROBOTIC TICKET SCRATCHING VIA LIVE REMOTE MOBILE INTERFACE

(71) Applicant: PAYRANGE INC., Portland, OR (US)

(72) Inventors: Paresh K. Patel, Portland, OR (US); Michael Kitchen, Pompano Beach, FL (US)

(73) Assignee: PAYRANGE INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,996

(22) Filed: Mar. 22, 2022

Related U.S. Application Data

(63) Continuation of application No. 17/478,907, filed on Sep. 18, 2021, now Pat. No. 11,278,789.

(60) Provisional application No. 63/203,666, filed on Jul. 27, 2021.

(51) Int. Cl.
*A63F 3/06* (2006.01)
*G06F 3/04883* (2022.01)
*G07F 17/32* (2006.01)
*G07F 17/42* (2006.01)

(52) U.S. Cl.
CPC .......... *A63F 3/068* (2013.01); *A63F 3/0655* (2013.01); *G06F 3/04883* (2013.01); *G07F 17/329* (2013.01); *G07F 17/3244* (2013.01); *G07F 17/42* (2013.01)

(58) Field of Classification Search
None
See application file for complete search history.

(56) References Cited

U.S. PATENT DOCUMENTS

| | | | |
|---|---|---|---|
| 9,997,025 B2 | 6/2018 | Anderson | |
| 2005/0199713 A1* | 9/2005 | Rathus | G06Q 30/0603 235/382 |
| 2007/0010311 A1* | 1/2007 | Irwin, Jr. | A63F 3/064 463/17 |
| 2014/0095225 A1 | 4/2014 | Williams | |
| 2018/0012453 A1* | 1/2018 | Anderson | G07F 17/3267 |
| 2018/0108004 A1* | 4/2018 | Jin | G06Q 20/401 |

OTHER PUBLICATIONS

Patel, Office-Action, U.S. Appl. No. 17/650,215, dated Apr. 11, 2022, 7 pgs.

(Continued)

*Primary Examiner* — Ronald Laneau
(74) *Attorney, Agent, or Firm* — Morgan, Lewis & Bockius LLP

(57) ABSTRACT

A controller is configured to obtain first image data from a camera associated with a ticket processing apparatus; transmit the first image data to an application server; receive, from the application server, a dispense command for the ticket processing apparatus; cause the ticket processing apparatus to dispense, based on the dispense command, a ticket having a scratching area; receive a user-provided scratching command from the application server; and cause a robotic scratching device to scratch, or remove an opaque substance from, the scratching area of the ticket in accordance with the user-provided scratching command.

20 Claims, 3 Drawing Sheets

(56) References Cited

OTHER PUBLICATIONS

Patel, Notice of Allowance, U.S. Appl. No. 17/650,215, dated May 5, 2022, 5 pgs.
Patel, Office Action, U.S. Appl. No. 17/655,998 dated May 18, 2022, 8 pgs.
Patel, Office Action, U.S. Appl. No. 17/655,999, dated May 20, 2022, 7 pgs.
Patel, Office Action, U.S. Appl. No. 17/662,291, dated Jul. 14, 2022, 6 pgs.
Patel, Corrected Notice of Allowability, U.S. Appl. No. 17/650,215, dated Aug. 23, 2022, 2 pgs.
Patel, Notice of Allowance, U.S. Appl. No. 17/655,998, dated Aug. 31, 2022, 5 pgs.

\* cited by examiner

US 11,547,928 B1

SYSTEM AND METHOD FOR ROBOTIC TICKET SCRATCHING VIA LIVE REMOTE MOBILE INTERFACE

RELATED APPLICATIONS

The present application is a continuation of U.S. application Ser. No. 17/478,907, filed Sep. 18, 2021, which claims priority to U.S. Provisional Patent Application No. 63/203,666, filed Jul. 27, 2021, each of which is hereby incorporated by reference in its entirety.

TECHNICAL FIELD

The present application relates to the field of network-connected robotic devices configured to interact with government-regulated lottery ticket dispensing machines.

BACKGROUND

Sales of lottery tickets (also referred to as scratch tickets or scratchers) are typically regulated by state or other governmental agencies, which require that tickets be sold at physical locations (e.g., points of sale) within their jurisdictions. As such, those who wish to participate in a preferred lottery game but cannot be present at one of these physical locations (e.g., due to a vacation, disability, or lack of convenient store location) may be prevented or discouraged from purchasing desired lottery tickets. Due to the nature of the lottery, many players prefer to purchase the same tickets and play the same numbers every lottery cycle, so the prospect of missing a particular lottery cycle can be disappointing.

In addition, lottery scratch tickets typically require physical actions as part of the gameplay. In some instances, tickets must be scratched off in order to reveal underlying information (e.g., numbers, shapes, patterns, and so forth) that is required to determine whether the ticket is a winner, and if so, what the prize for that ticket is. As a result, those with circumstances that make it difficult to physically play (e.g., due to a condition making it difficult to scratch the ticket) may be discouraged from playing.

Lastly, lottery scratch tickets may be split among a group of players (e.g., family members, coworkers, and so forth) in order to share the cost of purchasing multiple tickets ("lottery pools" or "office pools"), thereby increasing the odds of winning. In such instances, one person typically collects the money, purchases the tickets, plays the tickets, and reports the results back to the others. As such, the others in the group often do not get to share in the gameplay experience and may be less likely to continue to contribute to future group ticket purchases.

SUMMARY

This disclosure describes a system and method of using a robotic apparatus that enables virtual playing of a lottery game while complying with governmental regulations. Players who are not physically present at a point of sale (e.g., at a remote location), or who are physically present at a point of sale but who are unable to physically play the ticket, can participate in a desired lottery game. The presently described system and method allow such users to participate in the lottery in each of the aforementioned scenarios in a way that provides an equivalent level of engagement and complies with applicable state, local, federal, municipal, and/or international rules of game play (e.g., regarding location, signatures, audits, and so forth).

In one aspect, a system, method, and apparatus for robotic ticket scratching via a live remote mobile interface is disclosed. The user interface runs on an application on a mobile device, tablet, computer, or web browser. A user can be physically present in a remote location (such as a remote location within a particular state, or an international location). In some implementations, the user is not located remotely, but physically present (such as in a bingo hall) and could use the service for convenience or due to physical limitations.

In some implementations, ticket dispensing machines are loaded with rolls of tickets or loaded individually depending form factor of tickets acquired. There are one or more ticket dispensing machines in a setup. In some implementations, the machines are in a secure room. In some implementations, the machines are in retail or other public locations.

In some implementations, there is a live video feed of dispensers. Using the user interface, a user selects the desired ticket (and dispenser if the same ticket is available in multiple dispensers). A ticket is advanced from the dispenser.

In some implementations, cameras are located from multiple live angles, including top and bottom. As the ticket advances, the bottom camera images the ticket and a scanner scans the lot/serial number of the ticket. The controller sends that information to the application server. That ticket is assigned to the user by application server to the specific user. In some implementations, the user can remotely control the pan, tilt, and zoom of the one or more cameras.

In some implementations, the user can opt to sign the ticket using the mobile interface. The user inputs their signature using a touchscreen, computer mouse, stylus, digital pen, keyboard, or other input method capturing the X-Y signature (a digital facsimile of the signature).

In some implementations, the signature file is sent from the mobile application to the application server to the controller to a robotic arm that physically signs the ticket. The user can view the signature being rendered on the ticket in real time. In some implementations, the signature feedback is replicated on the user interface.

In some implementations, the user virtually scratches the ticket from the remote location using the touchscreen, mouse, stylus, digital pen, or other user input. In some implementations, the scratching of the ticket may be fully automated, requiring no interaction by the user (other than to begin and/or stop). In some implementations, the system can use random x-y coordinates.

In some implementations, as the user is scratching and watching the live video feed, the robotic arm is physically scratching, buffing, or by some other means remotely revealing the ticket. In some embodiments, there is a simulated ticket on the mobile device (with or without the video feed) and real-time feedback is provided to digitally simulate the ticket scratching on the mobile device. In some implementations, two or more people can be watching the same feed and/or virtual scratching. In some implementations, there can be guest watcher(s) that have no knowledge of the user or interest in the ticket.

In some implementations, upon completion of scratching, the barcode scanner scans the unique code that is revealed. In some implementations, the unique code is on the back side of the ticket. In some implementations, the unique code does not need to be revealed. In some implementations, the code is in a fixed spot and user interaction is not required to scratch the code.

In some implementations, the unique code is sent by the scanner to the ticket redemption terminal to the ticket agency's validation server which validates the ticket. The ticket status is returned. If the ticket is a winner, the application server sends the information including amount to the mobile application. The mobile application then can provide a visual, audible, and/or tactile alert to the user. The winning funds may be deposited into the user account. The user account can be linked to a bank or card account. In some implementations, the funds may be transferred to a virtual currency account (such as bitcoin).

In some implementations, back at the robotic machine, there is a ticket cutter that cuts the latest ticket from the stream of tickets. In some implementations, there is a ticket sorter that ejects or separates the winning tickets from the losing tickets. In some implementations, there can be a pile of error tickets as well in cases where there was a system error, incomplete scan, or incomplete scratch.

In some implementations, each transaction (scanning, signing, and/or scratching of the ticket) may be video logged and stored for later recall and authentication verification based on auditing and/or governing requirements.

BRIEF DESCRIPTION OF THE DRAWINGS

Like reference numerals refer to corresponding parts throughout the several views of the drawings.

DETAILED DESCRIPTION

In the era of mobile devices and connectivity, playing lottery games virtually can be accomplished using a robotic apparatus that is present within the governing jurisdiction, and a live remote mobile interface associated with the player. Examples of such a robotic apparatus, mobile interface, and methods of use thereof, are described herein.

Figure 1:
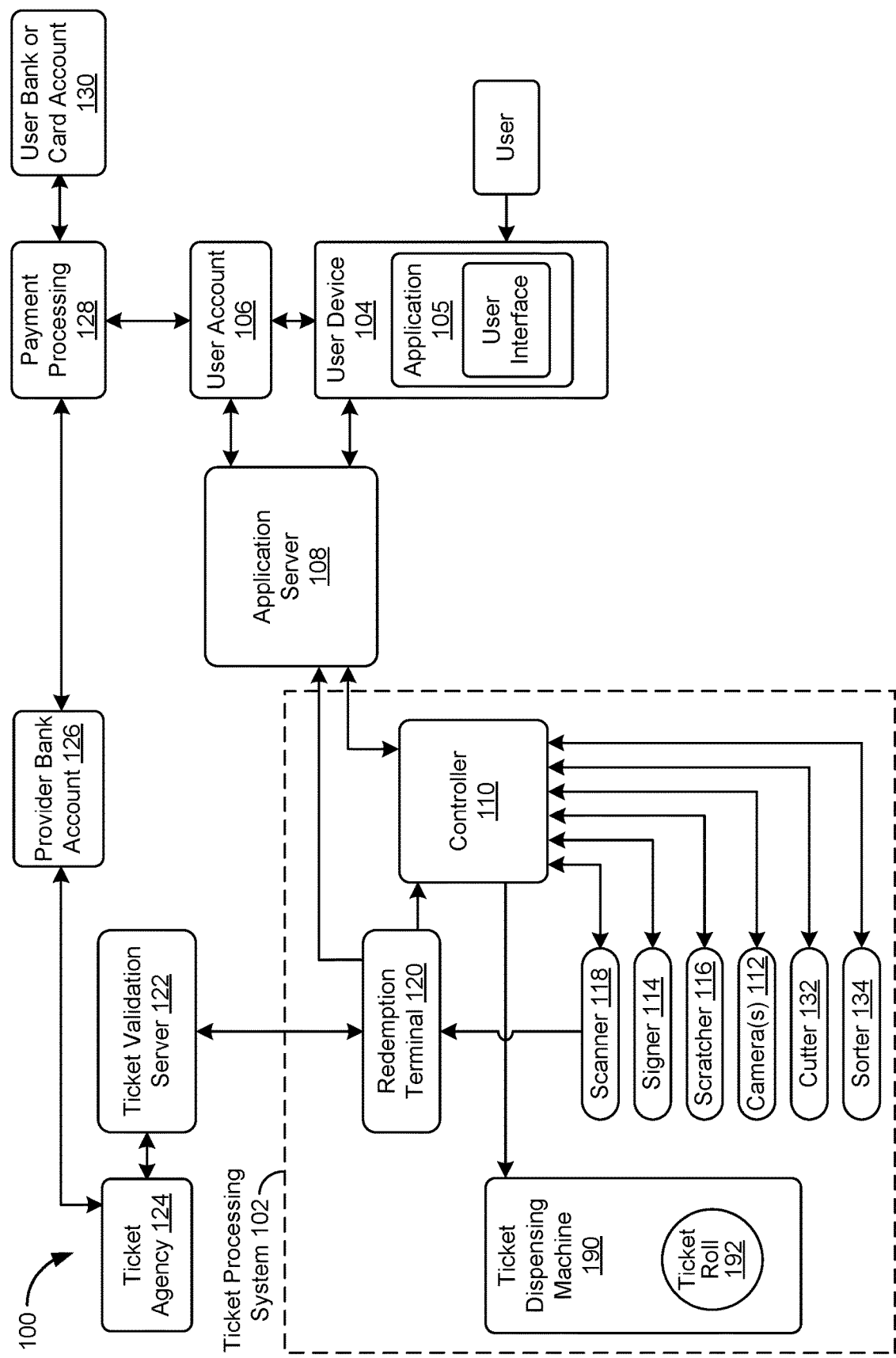
FIG. 1 is a system diagram of a network-connected lottery system 100 in accordance with some implementations.
Figure 2:
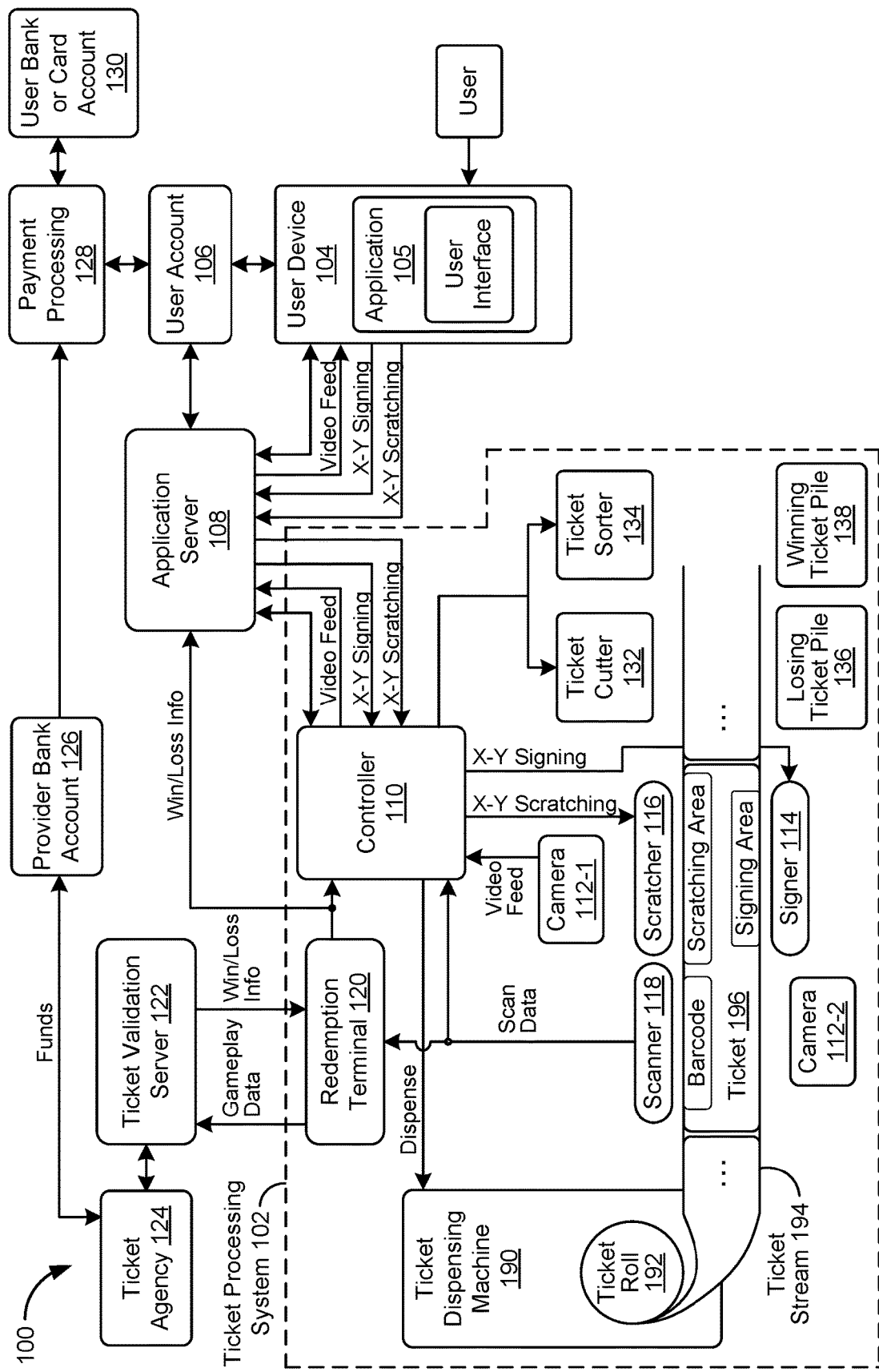
FIG. 2 is a schematic diagram of the network-connected lottery system 100 of FIG. 1 including data flows in accordance with some implementations.

FIG. 1 is a system diagram of a network-connected lottery system 100 in accordance with some implementations, and FIG. 2 is a schematic diagram of the network-connected lottery system 100 of FIG. 1 including more detailed data flows in accordance with some implementations.

As depicted in FIGS. 1 and 2, the lottery system 100 includes a ticket processing system 102, which is physically located in the jurisdiction that governs the lottery that is administered by the lottery system 100.

The ticket processing system 102 includes a ticket dispensing machine 190, a redemption terminal 120, a controller 110, a scanning device (scanner) 118, one or more video cameras 112, and a plurality of robotic components including a robotic signature mechanism (signer) 114, a robotic scratching mechanism (scratcher) 116, a cutting device (cutter) 132, and/or a sorting device (sorter) 134.

The ticket processing system 102 may be located in a public location (e.g., a retail or other public location), or in a private location, such as a secure room that is designed to house the various components of the processing system 102.

The ticket processing system 102, or components included in the ticket processing system 102, may be referred to as a robotic machine or apparatus. In some implementations, the components forming the robotic machine or apparatus include the controller 110, the signer 114, the scratcher 116, the cutter 132, the sorter 134, and hardware for receiving, moving, orienting, or otherwise handling tickets dispensed from the dispensing machine 190 in order to ensure proper imaging, scanning, signing, scratching, and processing of each ticket dispensed from the dispensing machine 190.

The ticket dispensing machine 190 includes a plurality of lottery tickets 192 (e.g., loaded with rolls 192 of tickets or loaded individually depending on the form factor of the tickets). There may be one or more ticket dispensing machines 190 in a single processing system 102.

The dispensing machine 190 is configured to receive a dispense command from the controller 110 and output a ticket specified by the dispense command (if there are multiple types of tickets within the dispensing machine 190), or output a ticket in accordance with receiving the dispense command regardless of whether the dispense command specifies a particular type of ticket (e.g., if there is only one type of ticket within the dispensing machine 190). The dispense command may include a quantity of tickets to dispense. In such a scenario, the dispensing machine 190 is configured to dispense the number of tickets specified by the dispense command, one at a time, so that the other components of the processing system 102 may process each ticket in the manner described below.

In some implementations, other components of the processing system 102 (e.g., the signer 114, scratcher 116, camera(s) 112, and/or scanner 118) may be disposed within the dispensing machine 190. Alternatively, the dispensing machine 190 may be a machine that is modified to accept dispense commands from the controller 110 in place of, or in addition to, dispense commands triggered by physical gameplay on the dispensing machine 190 itself (e.g., entering money, pressing selection buttons, and so forth). In such scenarios, the other components of the processing system 102 may be located outside of and in proximity to the dispensing machine 190 in order to process tickets outputted by the dispensing machine 190.

The tickets included in the dispensing machine 190 (e.g., arranged in a ticket roll 192 or any other arrangement) may also be referred to as scratch cards, scratch offs, scratch tickets, scratchers, scratch-its, scratch games, scratch-and-wins, instant games, or instant lotteries. The tickets may be constructed of thin paper-based card material or plastic. One or more areas may contain concealed information which can be revealed by scratching off an opaque substance (e.g., a silkscreen latex panel that bonds with the ticket body), or removing an adhesive. The opaque substance may also be referred to as a coating, panel, label, scratch coating, scratch panel, scratch label, scratch substance, or scratching area.

In some implementations, the entire scratchable area (or at least a threshold of the scratchable area) needs to be scratched to see whether a prize has been won. The ticket may be printed either to be a winner or not, or to reveal a secret code. In some implementations, the result does not depend upon the portions that are scratched off. In other implementations, some but not all areas have to be scratched; this may apply in a quiz, where the area corresponding to the right answer is scratched, or in some applications where, depending on which areas are scratched, the card wins or loses. In these cases the card becomes invalid if too many areas are scratched. After losing, one can scratch all areas to see if, how, and what one could have won with this ticket.

The video camera(s) 112 may be located at multiple locations within the ticket processing system 102, providing multiple live angles. For example, a first camera 112 may include the ticket dispensing machine(s) 190 in its field of view, a second camera 112 may include the top of a dispensed ticket 196 in its field of view, and a third camera 112 may include the bottom of a dispensed ticket 196 in its field of view. As such, users of the lottery system 100 may remotely view (i) the dispensing machine(s) 190 in order to determine which machine and/or ticket to select, (ii) the top of a dispensed ticket 196 in order to view a scratching area, and/or (iii) the bottom of a dispensed ticket 196 in order to view a signing area.

In some implementations, users can remotely control the pan, tilt, and zoom of the camera(s) 112. Optionally, two or more users can be watching the same video feed provided by the camera(s) 112 during a single ticket playing session (e.g., viewing virtual scratching as described below). In some implementations, there may be guest watchers that have no knowledge of the user or interest in the ticket being dispensed and scratched.

The scanner 118 is located proximate to an area in which dispensed tickets 196 are provided, and configured to scan identifying information on dispensed tickets 196. For example, identifying information for a ticket may include a unique code such as a lot number or serial number that identifies the ticket. Such a code may or may not be hidden behind the opaque substance. The scanner 118 is configured to transmit the identifying information (either the scan of the identifying information, or the identifying information itself) to the controller 110.

In some implementations, the scanner 118 is further configured to scan information (e.g., numbers, letters, symbols, markings, and so forth) that is hidden behind the opaque substance and revealed upon the ticket being scratched. The scanner 118 is configured to transmit such information (either the scan of the information, or the information itself) to the redemption terminal 120.

The ticket redemption terminal 120 either includes the scanner 118 or is coupled to the scanner 118, and is configured to receive data obtained by the scanner 118. Depending on the nature of the scanned data, the ticket redemption terminal 120 may transmit the scanned data (or information, such as a number, derived from the scanned data) to the controller 110 or the ticket validation server 122.

In a first example, the ticket redemption terminal 120 may send a scanned identification number (e.g., a serial number) of a dispensed ticket 196 to the controller 110, so that the controller 110 may link the ticket associated with the scanned identification number to a user account associated with a user currently playing that ticket (e.g., via user device 104 and application 105, application server 108, and controller 110).

In a second example, the ticket redemption terminal 120 may send scanned data associated with the game play of the ticket (e.g., a code revealed from under the opaque substance) to the ticket validation server 122 for validation by the ticket agency 124 (e.g., in order to validate that the ticket is a winner or not a winner). In some implementations, the data associated with the game play may be the identification number (e.g., the serial number). In other words, a single number may not only identify the ticket (and be linked to a user account by the application server 108), but also serve as the basis for validating whether the ticket is a winning ticket or not a winning ticket. In such scenarios, the ticket may not even need to be played (e.g., may not need to be scratched), and scanning a single number on a dispensed ticket 196 may be adequate in order to (i) link the ticket to a user account, and (ii) validate the status of the ticket (e.g., winner or loser).

The ticket redemption terminal 120 is configured to receive the ticket validation information (e.g., win/loss information) from the ticket validation server 122 and transmit the ticket validation information to the application server 108 for further processing.

The controller 110 comprises at least one processor (also referred to as a processing unit, processor, computer, programmable apparatus, or any electronic technology capable of executing instructions or operations). The controller 110 comprises or is communicatively coupled to memory storing one or more programs to be executed by the processing unit(s) of the controller. The memory includes computer readable media including, but not limited to, attached storage media (e.g., hard disk drives, network disk drives, servers), internal storage media (e.g., RAM, ROM, EPROM, FLASH-EPROM, or any other memory chip or cartridge), removable storage media (e.g., CDs, DVDs, flash drives, memory cards, floppy disks, flexible disks), firmware, and/or other known or yet to be discovered storage media. Depending on its purpose, the memory may be transitory and/or non-transitory.

The controller 110 is configured to receive dispense commands from the application server 108 and transmit received dispense commands to the dispensing machine 190. The controller 110 is also configured to receive video data from one or more cameras 112 and transmit the video data to the application server 108. The controller 110 is also configured to receive signing data and scratch data (described in more detail below) from the application server 108 and transmit the signing data and scratch data to the signer 114 and the scratch 116, respectively. The controller 110 is also configured to receive scan data (e.g., serial numbers and/or gameplay data as described above) from the scanner 118, and transmit the scan data to the application server 108 for linking to a user account 106.

In some implementations, the controller 110 may be configured to receive win/loss information from the redemption terminal 120 and transmit the win/loss information to the application server 108. Alternatively, the redemption terminal 120 (or the ticket validation server 122) may transmit the win/loss information to the application server 108 without going through the controller 110.

The signer 114 is a mechanical device that is configured to manipulate a writing tool (e.g., a pen, marker, or other signing tool) to sign the signing area of a ticket in accordance with signing data received from a user device 104 via the application server 108 and the controller 110. The signer 114 may also be referred to as a signing or signature device, signing or signature mechanism, signing or signature machine, automatic signer, or automatic pen. For example, the signer 114 may be a robotic arm.

The signer 114 may be controlled remotely by the user interface of an application 105 of a user device 104. The user may virtually (remotely) control the signer 114 to sign the dispensed ticket 196 by locally signing a user interface element resembling the signing area of the ticket on the application 105 of the user device 104. For example, the user may use a touchscreen, computer mouse, stylus, digital pen, keyboard, or other input method of the user device 104, thereby causing the application 105 to capture X-Y signature data (with the X and Y axes representing horizontal and vertical directions on a face of the ticket). In some implementations, the X-Y signature data corresponds to two-dimensional user-provided gestures corresponding to signature input at the user device. In some implementations, the user may view the signature being rendered on the ticket in real time, with signature feedback being replicated (displayed) on the user interface of the application 105.

The scratcher 116 is a mechanical device that is configured to manipulate a scratching tool (e.g., a needle, scratching tool, or other hard object) to scratch the opaque substance off of the scratching area of the ticket in accordance with scratching data received from a user device 104 via the application server 108 and the controller 110. The scratcher 116 may also be referred to as a scratching device, scratching mechanism, scratching machine, or automatic scratcher. For example, the scratcher 116 may be a robotic arm that physically scratches the ticket.

In some implementations, the scratcher 116 and the signer 114 may share some components. For example, a single robotic arm may be used to (i) sign the signing area of the ticket when configured in a signing mode (e.g., with a signing tool inserted at a moving end of the arm) and (ii) scratch the scratching area of the ticket when configured in a scratching mode (e.g., with a scratching tool inserted at the moving end of the arm). While the robotic arm is configured in one mode, the tool associated with the other mode may be retracted from the moving end of the arm.

In some implementations, the scratcher 116 and the signer 114 may be independently constructed and operated, such as for cases in which the scratching area is on one side of the ticket and the signing area is on the other side of the ticket. Alternatively, for such a ticket configuration, a ticket flipping mechanism may reorient the ticket so that a single robotic arm may both sign and scratch the ticket as described above.

The scratcher 116 may be controlled remotely by the user interface of an application 105 of a user device 104. The user may virtually (remotely) control the scratch 116 to scratch (or remove an opaque substance from) a scratching area of the dispensed ticket 196 by locally interacting with a user interface element resembling the scratching area of the ticket on the application 105 of the user device 104. For example, the user may use a touchscreen (e.g., by using swiping gestures), computer mouse, stylus, digital pen, keyboard, or other input method of the user device 104, thereby causing the application 105 to capture scratching data. In some implementations, the scratching data captured at the application 105 is X-Y scratching data (with the X and Y axes representing horizontal and vertical directions on a face of the ticket), corresponding to two-dimensional user-provided gestures corresponding to scratching input at the user device. Alternatively, the scratching data captured at the application 105 may include or comprise a command instructing the scratcher 116 to scratch (or remove an opaque substance from) a scratching area of the dispensed ticket, using a scratching pattern that is independent of any user-provided gestures. For example, the user may select a "scratch ticket" affordance on the user interface of the application 105, causing a scratch command to be sent to the scratcher 116. The scratcher 116 may receive the scratch command and use a preconfigured scratching pattern or a random scratching pattern to scratch (or remove an opaque substance from) the scratching area of the dispensed ticket.

In some implementations, the user may view the scratching on the dispensed ticket 196 in real time, with scratching feedback being replicated (displayed) on the user interface of the application 105. The scratching feedback may be a digital simulation of a ticket being scratched on the user interface, and/or live video feed of the dispensed ticket 196 being scratched by the scratcher 116.

In some implementations, rather than manually interacting with a scratching element of the user interface of the application 105, the scratching of the dispensed ticket 196 may be fully automated, requiring no interaction by the user, other than to begin and/or stop scratching (e.g., controlled by one or more affordances on the user interface).

The ticket cutter 132 (also referred to as a cutting device or cutting mechanism) is a mechanical device including a cutting element configured to separate dispensed tickets 196 from tickets in the stream 194 that have not yet been dispensed or otherwise processed. The ticket cutter 132 receives a cut command from the controller 110 after the ticket 196 has been processed (e.g., after the ticket has been signed, scratched, and scanned).

The ticket sorter 134 (also referred to as a sorting device or sorting mechanism) is a mechanical device including a sorting element configured to eject or separate the winning tickets from the losing tickets. The ticket sorter 134 receives a sort command from the controller 110 after the ticket 196 has been processed (e.g., after the ticket has been signed, scratched, and scanned). The ticket sorter 134 may place the winning tickets into a winning ticket pile or receptacle 138 and the losing tickets into a losing ticket pile or receptacle 136, making them available for system auditing and, in some cases, physical proof of winning tickets that may be sent (e.g., mailed or otherwise delivered) to the ticket agency 124 and/or the user who purchased and/or played the ticket. In some implementations, in the event of a system error, an incomplete scan, or an incomplete scratch, the ticket sorter 134 may place tickets corresponding to such errors into an error ticket pile or receptacle (not shown), making them available for system troubleshooting.

The application server 108 comprises at least one processor (also referred to as a processing unit, processor, computer, programmable apparatus, or any electronic technology capable of executing instructions or operations). The application server 108 comprises or is communicatively coupled to memory storing one or more programs to be executed by the processing unit(s) of the controller. The memory includes computer readable media including, but not limited to, attached storage media (e.g., hard disk drives, network disk drives, servers), internal storage media (e.g., RAM, ROM, EPROM, FLASH-EPROM, or any other memory chip or cartridge), removable storage media (e.g., CDs, DVDs, flash drives, memory cards, floppy disks, flexible disks), firmware, and/or other known or yet to be discovered storage media. Depending on its purpose, the memory may be transitory and/or non-transitory.

The application server 108 is configured to receive commands (e.g., system 102 selection commands, machine 190 selection commands, and/or ticket dispense commands) and data (e.g., signing and scratching data) from a plurality of user devices 104 (with one representative device being depicted in FIGS. 1 and 2) and transmit the commands and data to a plurality of ticket processing systems 102 (with one representative system 102 being depicted in FIG. 2). The application server 108 is also configured to receive commands and data (e.g., scan data and/or video data) from the plurality of user devices 104 and transmit the commands and data to the plurality of user devices 104.

In some implementations, the application server 108 is also configured to receives win/loss (ticket status) information from the redemption terminal 120 or from the controller 110, and transmit notifications to the user device 104 communicating the win/loss information.

In some implementations, the application server 108 is also configured to assign or link dispensed tickets 196 (based on or associated with received scan data, such as ticket serial numbers) to user accounts 106 corresponding to users who caused the tickets to be dispensed.

The user device 104 is an electronic communication device, such as a mobile device, tablet, computer, or web browser. Using one or more processors, the user device 104 executes a remote lottery application 105, which runs a user interface configured to provide outputs to the user (e.g., video feed(s) from the application server 108, menus providing options for selection dispensing machines and tickets, user interface affordances for accepting dispense commands, winning ticket notifications, and so forth). The user interface also accepts user inputs configured to operate the signer 114 and scratcher 116 as described above.

Using the application 105, a user can be physically present in a remote location while playing a lottery ticket offered by the ticket processing system 102. In some implementations, the user may not be located remotely, but may be physically present (such as in a bingo hall) at the location of the ticket processing system 102, optionally using the application 105 for convenience or due to physical limitations.

The application 105 displays video feed data (from the camera(s) 112) and receives selections for desired tickets and/or dispensing machines (if the same ticket is available in multiple dispensing machines). The application 105 receives inputs via an input module of the user device 104. The input module may comprise a touchscreen, computer mouse, stylus, digital pen, keyboard, or other input device capturing X-Y movements (e.g., for signing and/or scratching).

The application 105 receives win/loss information (including winning amounts) from the application server 108. The application 105 may cause the user device 104 to alert the user regarding the win/loss information using a visual, audible, and/or tactile alert.

The ticket agency 124 is associated with the tickets and/or ticket dispensing machines 190 offering the tickets. The ticket agency, through its ticket validation server 122, validates tickets and their win/loss statuses. Upon a ticket being confirmed to be a valid, winning ticket (by the ticket validation server 122) the ticket agency 124 deposits winning funds into the user account 106 linked to the ticket by the scanned identification number (e.g., serial number, as described above). The ticket agency 124 may deposit funds to the user via a provider bank account 126 and payment processing module or service 128. The user account 106 may be linked to a bank or card account 130. In some implementations, funds may be transferred to a virtual currency account (such as bitcoin) associated with the user account.

In some implementations, system 100 may include additional components, or only a subset of the components described above. For example, some implementations of system 100 may not include the ticket agency 124, ticket validation server 122, provider bank account 126, payment processing module 128, and/or user bank/card account 130. Instead, system 100 may be configured to communicate with one or more of these components.

In some implementations, one or more of the components of system 100 may be combined (i.e., operations for two or more components may be executed by a single server, device, controller, etc.). For example, the ticket validation server 122 and redemption terminal 120 may combined, the redemption terminal 120 and the controller 110 may be combined, and so forth.

In some implementations, one or more of the components of ticket processing system 102 may be implemented as a robotic machine. For example, a machine may be controlled by controller 110 and include the signer 114, scratcher 116, scanner 118, camera(s) 112, redemption terminal 120, cutter 132, sorter 134, and/or dispensing machine 190.

The ticket processing system 102 (specifically, the controller 110 and the redemption terminal 120) communicate with the other components of system 100 over one or more communication network connections (denoted by arrows in the figures). The communication network connections may be wired or wireless communications connections that are ongoing (e.g., dedicated connections, dedicated online connection, and/or hardwired connections) or accessible on demand (e.g., supporting the ability for the machine to make a temporary connection to a server or the ability for the user device to contact a server). Examples of such network connection technology may include hardwired, telephone network technology, cellular technology (e.g., GSM, CDMA, or the like), Wi-Fi technology, wide area network (WAN), local area network (LAN), or any wired or wireless communication technology over the Internet that is known or yet to be discovered. Stated another way, each communication network connection may be implemented over a communication network using a wired or wireless communication protocol (e.g., any of WiFi, Bluetooth, ZigBee, Z-Wave, 6LoWPAN, Thread, 4G, 5G, and the like).

Communications within the ticket processing system 102 (denoted by arrows in the figures) may take place using the communication technologies described above. Additionally or alternatively, such communications may take place using short-range communication technology, such as Bluetooth (such as Bluetooth 4.0, Bluetooth Smart, Bluetooth Low Energy (BLE)), near-field communication (NFC), Ultra Wideband (UWB), radio frequency identification (RFID), infrared wireless, induction wireless, or any wired or wireless technology that could be used to communicate a small distance (approximately a hundred feet or closer) that is known or yet to be discovered.

Figure 3:
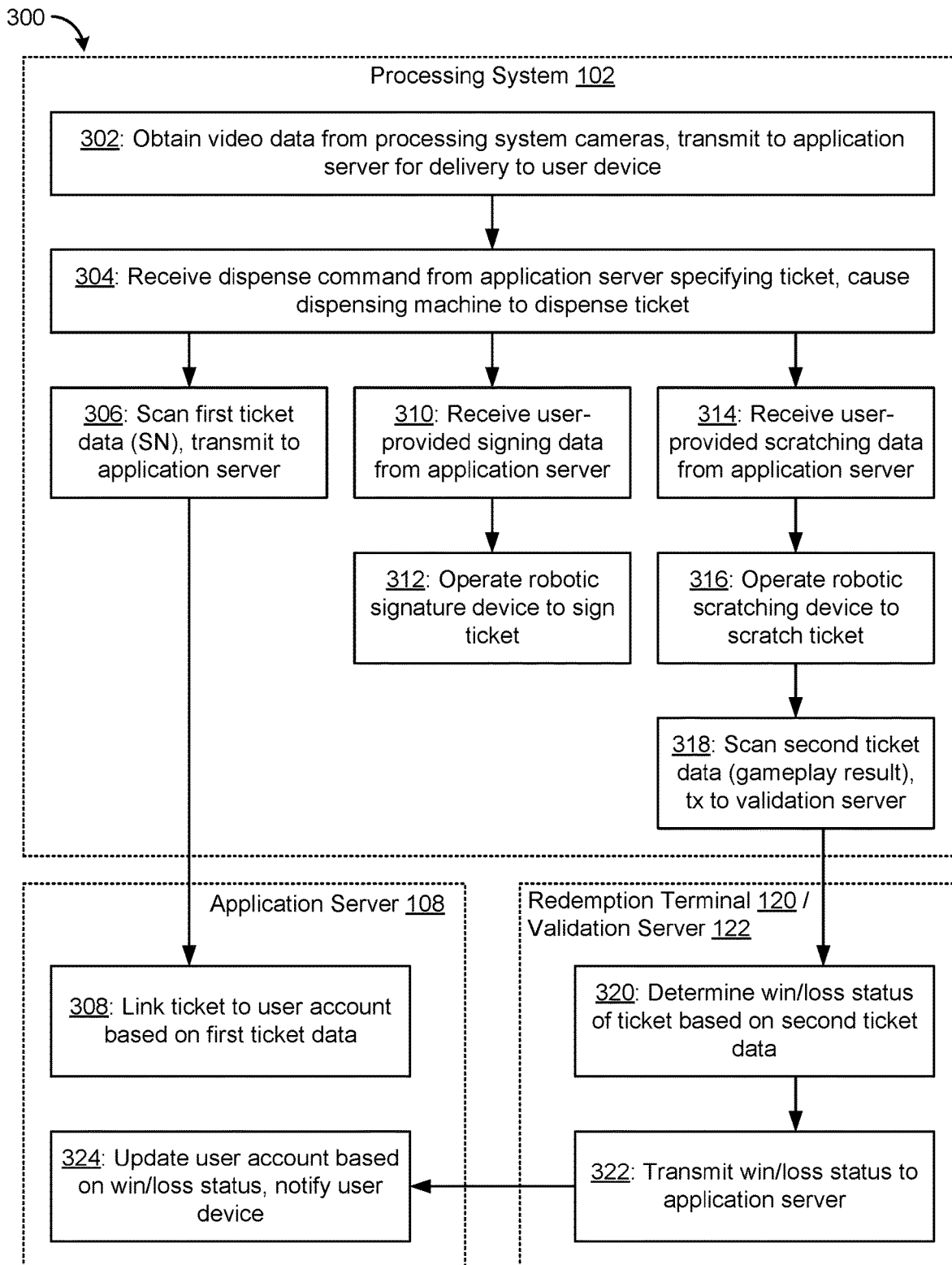
FIG. 3 is a flow diagram of a method of operating a ticket processing system of the lottery system 100 of FIGS. 1 and 2 in accordance with some implementations.

FIG. 3 is a flow diagram of a method of operating a ticket processing system of the lottery system 100 of FIGS. 1 and 2 in accordance with some implementations. Method 300 is, optionally, governed by instructions that are stored in computer memories or non-transitory computer readable storage mediums of processing system 102, application server 108, redemption terminal 120, and/or validation server 122. Such instructions may be executed by one or more processors of the aforementioned devices. The computer readable storage mediums may include magnetic or optical disk storage devices, solid state storage devices such as Flash memory, or other non-volatile memory devices. The instructions stored on each computer readable storage medium may include one or more of: source code, assembly language code, object code, or other instruction formats that are interpreted by one or more processors. Some operations in method 300 may be combined and/or the order of some operations may be changed.

Method 300 may begin with operation 302 or 304. At operation 302, the controller 110 obtains, from one or more video cameras 112 in proximity to a ticket dispensing machine 190, a first video stream (showing a live feed of the dispensing machine), and transmits the first video stream to an application server 108 for delivery to a user device 104.

Using the user interface of an application 105 running on the user device 104, a user selects a desired ticket and/or dispensing machine 190, optionally based on the first video stream (e.g., the user views the available tickets and/or dispensing machines in the video feed and makes a selection in the user interface).

Upon receiving the user selection, the user device transmits a dispense command to the controller 110 via the application server 108, where it is received at operation 304. Upon receiving the dispense command, the controller 110 causes the selected dispensing machine to dispense the selected ticket. The dispensed ticket is a physical lottery ticket that has a scratching area, a signature area, and/or an identification code (e.g., a lot number or serial number) that is either viewable upon being dispensed, or must be revealed by a scratcher.

As the ticket advances, a first camera 112 (e.g., a bottom camera) images the ticket and a scanner 118 scans the identification code (operation 306) of the ticket. The controller 110 transmits the scanned identification number (referred to as first ticket data) to the application server 108. In operation 308, the application server 108 links (i.e., assigns, associates) the identification code of the ticket to a user account 106 associated with the user device 104.

Before, during, or after operation 306, the controller 110 receives user-provided signing data (operation 310) and/or user-provided scratching data (operation 314) from the application server 108 (obtained by the user device 104). The signing data causes a robotic signature device to sign the signature area of the ticket (operation 312), and/or the scratching data causes a robotic scratching device to scratch the scratching area of the ticket (operation 316).

In other words, the user can opt to sign the ticket (operation 310) using the user interface of the application 105. The user inputs a signature using a touchscreen, computer mouse, stylus, digital pen, keyboard, or other input method capturing the X-Y Signature. The signature file is sent from the mobile application to the application server to the controller to a robotic arm that physically signs the ticket (operation 312). The user can view the signature being rendered on the ticket in real time. In some implementations, the signature feedback is replicated on the user interface.

Before, during, or after the signing operation, the user may virtually scratch the ticket (operation 314) using the touchscreen, mouse, stylus, digital pen, or other user input. In some implementations, the scratching of the ticket may be fully automated, requiring no interaction by the user (other than to begin and/or stop). In some implementations, the scratching device can use random x-y coordinates. As the user performs scratching gestures on the user interface and/or watches the live video feed, the robotic arm physically scratches the ticket. In some implementations, there is a simulated ticket on the user device 104 (with or without the video feed) and real-time feedback is provided to digitally simulate the ticket scratching on the user device 104.

Upon completion of the scratching operation, the scanner 118 scans (operation 318) information that is revealed in the scratching area (referred to as second ticket data). The information may include a unique code, gameplay numbers, or any other data initially hidden underneath the opaque substance before the scratching operation. In some implementations, the information does not need to be revealed. In some implementations, the information is in a fixed spot and/or a scratching operation is not required. The scanner 118 transmits the second ticket data (the revealed information) to the ticket redemption terminal 120 for processing by the ticket validation server 122 (or is sent directly to the ticket validation server 122).

Upon receiving the second ticket data, the ticket agency (by way of the validation server 122) determines ticket status data corresponding to a win status or a loss status of the ticket based on the second ticket data in operation 320. If the ticket is a winning ticket (the ticket status data corresponding to a win status), the validation server 122 transmits a notification to the application server 108 (for delivery to the user device)) including an amount associated with the win status of the ticket in operation 322.

The application server 108 updates the user account based on the win/loss status, and notifies the user device accordingly (operation 324). Funds corresponding to the amount associated with the win status may be automatically transferred to a bank account linked to the user account associated with the user device (e.g., by the ticket agency using a payment processing service 128).

In some implementations, after the ticket is processed (upon completion of operations 312, 316, and 318), the controller 110 may cause a cutting device 132 to cut or otherwise separate the processed ticket from a stream of tickets. The controller 110 may further cause a sorting device 134 to ejects or separate the winning tickets from the losing tickets, thereby storing the processed ticket in accordance with win or loss status. In some embodiments, there may be a pile of error tickets in cases where there was a system error, an incomplete scan, or incomplete scratch.

In some implementations, each ticket processing transaction (e.g., operations 302-318 at the processing system 102) may be video logged and stored (e.g., at the controller 110 and/or the application server 108) for later recall and authentication verification, thereby satisfying auditing and/or governing requirements.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims.

For example, specific features of the exemplary embodiments may or may not be part of the claimed invention, different components as opposed to those specifically mentioned may perform at least some of the features described herein, and features of the disclosed embodiments may be combined.

As used herein, the terms "about" and "approximately" may refer to + or −10% of the value referenced. For example, "about 9" is understood to encompass 8.2 and 9.9.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

It will be understood that, although the terms "first," "second," etc. are sometimes used herein to describe various elements, these elements should not be limited by these terms. These terms are only used to distinguish one element from another.

For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

As used herein, the term "if" may be, optionally, construed to mean "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The terminology used herein is for the purpose of describing particular implementations only and is not intended to be limiting of the claims.

As used in the description of the implementations and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items.

It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in accordance with a determination" or "in response to detecting," that a stated condition precedent is true, depending on the context.

Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

The invention claimed is:

1. A system comprising one or more controllers configured to:
    obtain first image data from a camera associated with a ticket machine;
    transmit the first image data to an application server;
    receive, from the application server, a dispense command for the ticket machine;
    cause the ticket machine to dispense, based on the dispense command, a ticket having a scratching area;
    receive a user-provided scratching command from the application server; and
    cause a robotic scratching device to scratch, or remove an opaque substance from, the scratching area of the ticket in accordance with the user-provided scratching command.

2. The system of claim 1, wherein the one or more controllers are further configured to:
    receive user-provided signing data from the application server; and
    cause a robotic signature device to sign a signature area of the ticket in accordance with the user-provided signing data.

3. The system of claim 1, wherein the one or more controllers are further configured to:
    obtain, from a scanning device associated with the ticket machine, an identification code of the ticket; and
    transmit the identification code to a ticket validation server.

4. The system of claim 1, further comprising a ticket validation server configured to:
    determine ticket status data corresponding to a win status or a loss status of the ticket based on an identification code of the ticket; and
    in accordance with the ticket status data corresponding to a win status of the ticket:
        transmit a notification to a user device including an amount associated with the win status of the ticket; and
        cause funds corresponding to the amount associated with the win status to be transferred to a bank account linked to a user account associated with the user device.

5. The system of claim 1, wherein the one or more controllers are further configured to:
    cause a cutting device to separate the ticket from a stream of tickets; and
    cause a sorting device to store the ticket in accordance with a win status or a loss status of the ticket.

6. The system of claim 1, further comprising an application server configured to:
    obtain, from a scanning device, an identification code of the ticket; and
    link the identification code with a user account associated with a user device.

7. The system of claim 1, wherein the first image data includes an image of the ticket machine and/or an image of the ticket.

8. The system of claim 2, wherein the ticket comprises a physical ticket body having two surfaces, the scratching area includes an opaque substance bonded to one of the two surfaces, and the signature area includes a blank portion of one of the two surfaces.

9. The system of claim 2, wherein the user-provided signing data includes X-Y data obtained from a user interface of a user device, wherein the X-Y data corresponds to two-dimensional user-provided gestures corresponding to signature input at the user interface.

10. The system of claim 1, wherein:
    the user-provided scratching command causes the robotic scratching device to begin scratching, or removing the opaque substance from, the scratching area of the ticket; and
    the robotic scratching device is configured to scratch, or remove the opaque substance from, the scratching area of the ticket using a preconfigured or random scratching pattern.

11. The system of claim 2, wherein the one or more controllers are further configured to obtain, from a second camera associated with the ticket machine, second image data including an image of the signature area of the ticket while the robotic signature device signs the signature area.

12. The system of claim 1, wherein the one or more controllers are further configured to obtain, from a second camera associated with the ticket machine, second image data including an image of the scratching area of the ticket while the robotic scratching device scratches the scratching area.

13. A method, comprising:
at a ticket processing system:
obtaining first image data from a camera associated with a ticket machine;
transmitting the first image data to an application server;
receiving, from the application server, a dispense command for the ticket machine;
causing the ticket machine to dispense, based on the dispense command, a ticket having a scratching area;
receiving a user-provided scratching command from the application server; and
causing a robotic scratching device to scratch, or remove an opaque substance from, the scratching area of the ticket in accordance with the user-provided scratching command.

14. The method of claim 13, further comprising:
at the ticket processing system:
receiving user-provided signing data from the application server; and
causing a robotic signature device to sign a signature area of the ticket in accordance with the user-provided signing data.

15. The method of claim 13, further comprising:
at the ticket processing system:
obtaining, from a scanning device associated with the ticket machine, an identification code of the ticket; and
transmitting the identification code to a ticket validation server.

16. The method of claim 13, further comprising:
at a ticket validation server:
determining ticket status data corresponding to a win status or a loss status of the ticket based on an identification code of the ticket; and
in accordance with the ticket status data corresponding to a win status of the ticket:
transmitting a notification to a user device including an amount associated with the win status of the ticket; and
causing funds corresponding to the amount associated with the win status to be transferred to a bank account linked to a user account associated with the user device.

17. A non-transitory computer readable storage medium storing one or more programs configured for execution by a computer system, the one or more programs including instructions for:
obtaining first image data from a camera associated with a ticket machine;
transmitting the first image data to an application server;
receiving, from the application server, a dispense command for the ticket machine;
causing the ticket machine to dispense, based on the dispense command, a ticket having a scratching area;
receiving a user-provided scratching command from the application server; and
causing a robotic scratching device to scratch, or remove an opaque substance from, the scratching area of the ticket in accordance with the user-provided scratching command.

18. The non-transitory computer readable storage medium of claim 17, wherein the one or more programs further include instructions for:
receiving user-provided signing data from the application server; and
causing a robotic signature device to sign a signature area of the ticket in accordance with the user-provided signing data.

19. The non-transitory computer readable storage medium of claim 17, wherein the one or more programs further include instructions for:
obtaining, from a scanning device associated with the ticket machine, an identification code of the ticket; and
transmitting the identification code to a ticket validation server.

20. The non-transitory computer readable storage medium of claim 17, wherein the one or more programs further include instructions for:
causing a cutting device to separate the ticket from a stream of tickets; and
causing a sorting device to store the ticket in accordance with a win status or a loss status of the ticket.

\* \* \* \* \*